(12) United States Patent
Caine

(10) Patent No.: US 8,072,642 B2
(45) Date of Patent: *Dec. 6, 2011

(54) METHOD OF SCHEDULING PHOTOGRAPH PRINT JOBS

(75) Inventor: Holden Caine, Boulder, CO (US)

(73) Assignee: FUJIFILM North America Corporation, Valhalla, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,028

(22) Filed: Aug. 16, 2010

(65) Prior Publication Data

US 2011/0007357 A1    Jan. 13, 2011

Related U.S. Application Data

(63) Continuation of application No. 11/673,312, filed on Feb. 9, 2007, now Pat. No. 7,777,908.

(60) Provisional application No. 60/776,535, filed on Feb. 24, 2006.

(51) Int. Cl.
    *G06F 15/00*    (2006.01)
    *G06F 3/12*    (2006.01)
    *G06K 1/00*    (2006.01)

(52) U.S. Cl. ..................... 358/1.15; 358/1.13

(58) Field of Classification Search ............. 358/1.15, 358/1.13, 1.1
See application file for complete search history.

(56) References Cited

U.S. PATENT DOCUMENTS

| 7,184,158 | B2 | 2/2007 | Shiozaki |
| 7,619,764 | B2 | 11/2009 | Fukunaga et al. |
| 2007/0013940 | A1 | 1/2007 | Field |

*Primary Examiner* — Douglas Tran

(74) *Attorney, Agent, or Firm* — Woods Oviatt Gilman LLP

(57) ABSTRACT

A system and method of scheduling print jobs is provided. In particular, photograph print jobs at a printing facility are scheduled by a scheduling application program which takes into account at least one parameter of each print order as the orders are received, including the time that the order is to be filled and the type of paper to be used.

10 Claims, 1 Drawing Sheet

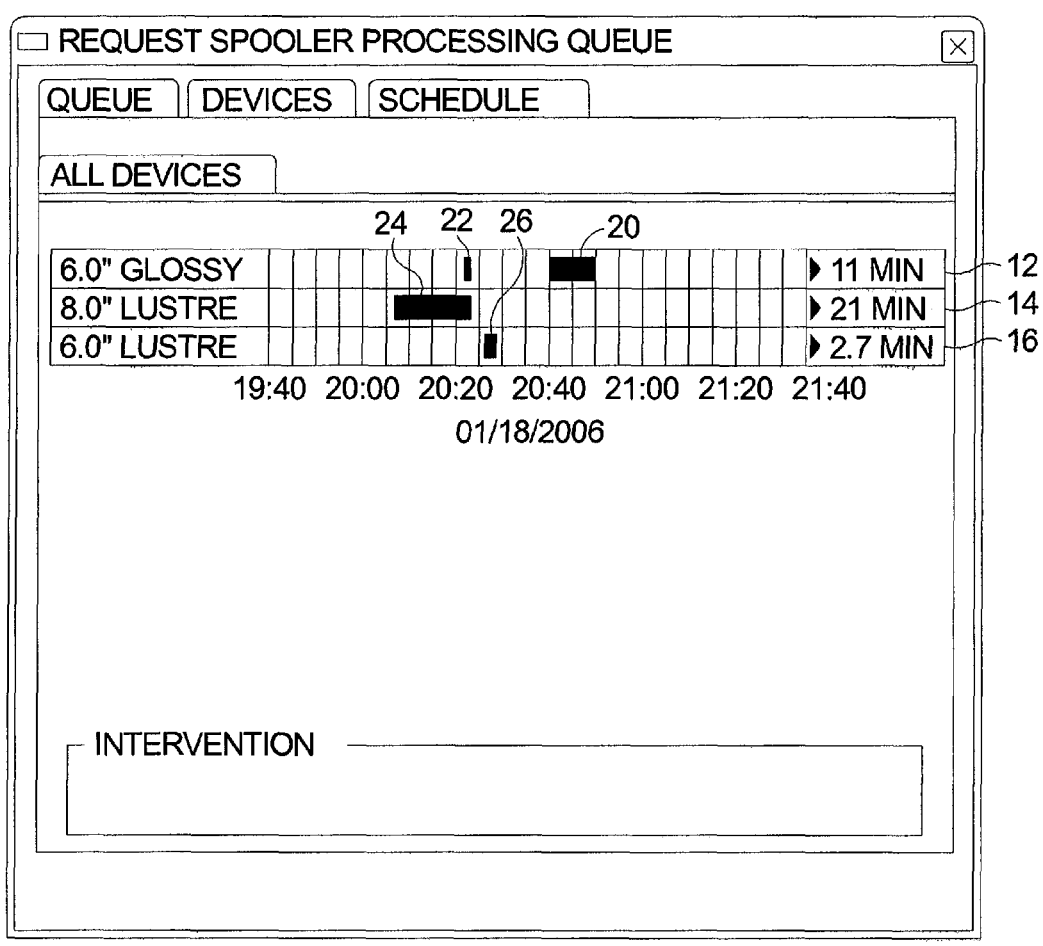

METHOD OF SCHEDULING PHOTOGRAPH PRINT JOBS

CROSS-REFERENCE TO RELATED APPLICATIONS

This application is a continuation of U.S. patent application Ser. No. 11/673,312, filed Feb. 9, 2007, which claims the benefit of U.S. Provisional Patent Application No. 60/776,535, filed Feb. 24, 2006.

TECHNICAL FIELD

The present invention relates to a system and method of scheduling photographic print jobs.

BACKGROUND OF THE INVENTION

Photographic printing facilities which can provide photo prints to customers who come to the facility are wide spread throughout the U.S., generally at stores such as photographic equipment stores and chain discount stores. Printing orders may be received from customers that are located at the photograph printing facility, and can also be received electronically over the internet or from kiosks. The photographic printing facility generally provides various printing options for the customer to choose from. For example, the customer may select a "due-by" time for the prints, for example within one hour or overnight, and the type and size of paper that the photographs are to be printed on. Currently, the operator of the photograph printing machine usually arranges the print jobs to provide the photographs at the "due-by" time selected by the customer.

In some situations, a combination of a plurality of print orders can create a scheduling problem for the photograph printing machine if the operator is not able to meet all of the due-by times for all of the print orders received by the photograph printing facility.

What is needed is a method for better utilization of the photographic printing machine compared to the method used by the operator of the photographic printing machine.

SUMMARY OF THE INVENTION

A system for fulfilling a plurality of print orders is provided and includes a scheduling application program and a photograph processing machine. The scheduling application program is configured to allow a set of parameters to be entered for each of the print orders, one of the parameters being a due-by time for each of the print orders. The scheduling application program is also configured to compute a first print schedule for the photograph processing machine using a first algorithm which has a first acceptance criteria. The first print schedule is selected to print the plurality of print orders on the photograph printing machine if the first print schedule meets the acceptance criteria of the first algorithm. The scheduling application program is configured to compute a second print schedule using a second algorithm and select the second print schedule to print the plurality of print orders on the photograph printing machine if the first print schedule does not meet the acceptance criteria of the first algorithm.

A method of scheduling a plurality of print orders for a photograph processing machine is also provided. The method includes: accepting a set of parameters for each of the plurality of print orders, one of the parameters being a due-by time for each of the plurality of print orders; computing a first print schedule for the photograph processing machine using a first algorithm which has a first acceptance criteria; selecting the first print schedule to print the plurality of print orders on the photograph printing machine if the first print schedule meets the acceptance criteria of the first algorithm; and computing a second print schedule using a second algorithm and selecting the second print schedule to print the plurality of print orders on the photograph printing machine if the first print schedule does not meet the acceptance criteria of the first algorithm.

Another method of scheduling at plurality of print orders for a photograph processing machine is provided and includes: a) accepting a set of parameters for each of the plurality of print orders, one of the parameters being a due-by time for each of the plurality of print orders; b) computing a first print schedule for the photograph processing machine using a first algorithm which has a first acceptance criteria; c) determining if the print schedule last computed meets an acceptance criteria of a last used algorithm; d) selecting the print schedule last computed to print the plurality of orders on the photograph printing machine if the print schedule last computed meets the acceptance criteria of the last used algorithm; e) computing another print schedule using another algorithm if the last computed print schedule does not meet the acceptance criteria of the last used algorithm; and f) repeating steps c), d), and e) if necessary until the determination of step c) is positive.

Yet another method of scheduling a plurality of print orders for a photograph processing machine is provided. The method includes: placing the plurality of print orders in sequence based on a due-by time of each of the plurality of print orders, the plurality of print orders including a first print order and a second print order, the first print order having the latest due-by time relative to the other print orders in the sequence, the second print order having a due-by time next to the latest relative to the other print orders in the sequence; calculating a start time for the first print order so that the first print order finishes at the due-by time of the first print order; and calculating a start time for the second print order so that the second print order finishes at the calculated start time of the first print order.

A further method of scheduling a plurality of print orders for a photograph processing machine is provided and includes: selecting a first print order which has a latest due-by time for all of the plurality of print orders; calculating a start time for the first print order so that the first print order is calculated to finish at the due-by time of the first print order; selecting a next print order which has the latest due-by time for all of the plurality of print orders which have not had a start time calculated; and calculating a start time for the next print order so that the next print order is calculated to finish at a last calculated start time.

Another system for fulfilling a plurality of print orders is provided, wherein the plurality of print orders includes a first group of print orders and a second group of print orders. The system may generally include a scheduling application program, a first photograph processing machine, and a second photograph processing machine. The scheduling application program is configured to allow a set of parameters to be entered for each of the print orders, one of the parameters being a due-by time for each of the print orders. The scheduling application program is also configured to compute a first print schedule for the first photograph processing machine using a first algorithm which has a first acceptance criteria. The first print schedule is selected to print the first group of print orders on the first photograph printing machine if the first print schedule meets the acceptance criteria of the first algorithm. The scheduling application program is configured to compute a second print schedule using a second algorithm and select the second print schedule to print the first group of print orders on the first photograph printing machine if the first print schedule does not meet the acceptance criteria of the first algorithm. The scheduling application program is also configured to compute a third print schedule for the second photograph processing machine using a third algorithm which has a second acceptance criteria. The third print schedule is selected to print the second group of print orders on the second photograph printing machine if the third print schedule meets the acceptance criteria of the third algorithm. The scheduling application program is configured to compute a fourth print schedule using a fourth algorithm and select the fourth print schedule to print the second group of print orders on the second photograph printing machine if the third print schedule does not meet the acceptance criteria of the third algorithm.

In the system set forth in the previous paragraph, the first photograph processing machine may have a different printing time compared to the second photograph processing machine for the same size of photograph, at least one of the first and second groups may includes a single print order, or the first group of print orders may include a different parameter compared to the second group of print orders, wherein the different parameter may be photograph paper size or due-by time. For example, the differing parameter of due-by time may include a due-by time that is one hour after an order time and a due-by time that is greater than one hour after the order time (e.g., one-hour delivery/overnight delivery). In addition, the first algorithm may be the same as the third algorithm, the second algorithm may be the same as the fourth algorithm. Furthermore, the first print schedule for the first printer may be the same as third print schedule for second printer, or the second print schedule for the first printer may be the same as fourth print schedule for second printer. Moreover, the first acceptance criteria may be the same as second acceptance criteria, for example, the first and second acceptance criteria may be fulfilling the plurality of print orders by the due-by time of each of the print orders.

Another method of scheduling a plurality of print orders is provided, wherein the plurality of print orders include a first group of print orders and a second group of print orders. The method includes: a) accepting a set of parameters for each of the plurality of print orders, one of the parameters being a due-by time for each of the plurality of print orders; b) computing a first print schedule for a first photograph processing machine using a first algorithm which has a first acceptance criteria; c) selecting the first print schedule to print the first group of print orders on the first photograph processing machine if the first print schedule meets the first acceptance criteria of the first algorithm; d) computing a second print schedule using a second algorithm and selecting the second print schedule to print the first group of print orders on the first photograph processing machine if the first print schedule does not meet the first acceptance criteria of the first algorithm; e) computing a third print schedule for a second photograph processing machine using a third algorithm which has a second acceptance criteria; f) selecting the third print schedule to print the second group of print orders on the second photograph processing machine if the third print schedule meets the second acceptance criteria of the third algorithm; and g) computing a fourth print schedule using a fourth algorithm and selecting the fourth print schedule to print the second group of print orders on the second photograph processing machine if the third print schedule does not meet the second acceptance criteria of the third algorithm.

BRIEF DESCRIPTION OF THE DRAWING

The accompanying drawing, which is incorporated into and forms a part of the specification, illustrates an embodiment of the present invention and, together with the description, serves to explain the principles of the invention. The drawing is only for the purpose of illustrating a preferred embodiment of the invention and is not to be construed as limiting the invention.

The sole FIGURE shows a computer screen generated by a scheduling application program used in optimizing the utilization of a photograph printing machine.

DETAILED DESCRIPTION OF THE INVENTION

A system and method of scheduling of photographic print jobs on one or more photograph printing machines is provided in accordance with the present invention. In an embodiment of the present invention, each of the options available to a customer, hereinafter referred to as the order parameters, which have been selected by the customer, are input to a scheduling application program on a computer which establishes a printing schedule for a photograph printing machine or machines at a photograph printing facility. The scheduling application program executes a progression of scheduling algorithms taking into account the parameters of each of the orders until one of the algorithms generates a printing schedule that the algorithm determines is acceptable. The goal is to generate a printing schedule that meets all of the present orders due-by times, or a printing schedule which will select which due-by times are to be slipped based on business considerations such as the probable impact on future orders.

The sole FIGURE shows a computer screen 10 of the scheduling application program which has three time lines 12, 14, and 16 for 6 inch glossy, 8 inch lustre, and 6 inch lustre photographic paper types, respectively, that can be used in the photograph printing machine. Also shown are the time periods that four orders 20, 22, 24, and 26 are to be processed. The time lines provide a visual display of the projected printing load of the photograph printing machine.

In one embodiment of the present invention, the printing schedule generated by one or more of the algorithms is displayed, even though the schedule may not meet the acceptability test of the algorithm so that an operator looking at the printing schedule can intervene manually to adjust the printing schedule if such an adjustment is considered desirable by the operator. The printing schedule resulting from the intervention by the operator may then become a final printing schedule.

The first algorithm may be to schedule each of the print orders in the order in which they were received categorized by the type of delivery service. For example, all orders for one-hour processing would be placed in the printing schedule according to the time that the print order was received, and all the print orders that are processed for overnight processing would be scheduled after the one-hour processing orders and according to the time that the overnight print order was received. Such a printing schedule may satisfy the due-by times of all of the orders. If the resulting printing schedule does not meet the due-by times, the time lines 12, 14, and 16 would show that the due-by times are not met for all of the print orders using a particular algorithm by highlighting the orders with the missed due-by times.

The total time needed by the photograph printing machine to print each print order depends on whether the paper presently in the machine is the same as required to fulfill the order, or if the paper needs to be changed, in which case the time for the paper change may be included in the printing schedule. Thus, printing several print orders requiring the same type of paper before printing other print orders needing a different printing paper is almost always more efficient than printing the orders based on when the orders were received. Also, calculating the printing time may take into account the time needed by the operator of the photograph processing machine to collect the prints and place them in the correct envelope prior to the due-by time.

Another variable which may be taken into account by the scheduling application program is the situation in which there is more than one photograph printing machine at the photograph processing facility. In the multi-photograph printing machine system, the photograph printing machines may have differing print times for the same size of photograph. Therefore, the print orders received by the scheduling application program may need to be arranged into two or more groups in order to generate a printing schedule for each of the photograph printing machines that will meet all of the print orders due-by times. For example, one or more of the photograph printing machines may be used to print a certain size photograph, associated with a first group of print orders, and one or more of the other photograph printing machines may be used to print a different size photograph, associated with a second group of print orders, to eliminate down time associated with changing paper sizes if only a single photograph printing machine is used to fulfill the print orders. In the multi-photograph printing machine system described herein, each of the photograph printing machines would generate a printing schedule in accordance with the method described above that will meet all of the print orders due-by times for the print order group that each of the photograph printing machines is associated with, and also allow an operator to manually adjust each of the print schedules due to business considerations such as probable impact on future orders.

It will be understood that more than two groups of print orders may be established from the total number of print orders received from the system, and one or more of the established print order groups may be assigned to each of the photograph printing machines included in the system. In other words, the first and third print order groups may be assigned to one photograph printing machine, and the second print order group may be assigned to another photograph printing machine in the system. Moreover, it will be understood that the groups of printing orders may be arranged according to parameters such as due-by time (e.g., one-hour/overnight delivery), in-store pickup or mail delivery, paper type, paper size, printing characteristics (e.g., color/black and white), or any other print order parameter. In addition, the printing schedules established for each of the photograph printing machines in the system may be the same or different. Further, the acceptance criteria for each of the algorithms used to generate the print schedules for each of the photograph printing machines may be the same, such as fulfilling the print orders by the due-by time of each of the print orders within the assigned print order group, or the acceptance criteria may be different.

In another embodiment, the scheduling application program lists either all of the outstanding orders or, alternatively, the outstanding orders which have due-by times that are close. For example generating a list of one-hour print orders (due-by time that is one hour after an order time) separate from the overnight print orders (due-by time that is greater than one hour after the order time). The scheduling application program orders the list by the latest due-by time, and calculates the processing time for each order by adding the time needed to change the paper in the printer to the time needed to actually print the photographs which is dependent on the size of the order and the printer performance.

The start time for the first print order on the list, which has the latest due-by time, is calculated by subtracting the order processing time from the order due-by time. For subsequent print orders on the list, the start time for each print order is calculated by subtracting the order processing time of the current print order on the list from the start time calculated for the previous print order on the list. If the paper type for the current print order on the list is the same as the paper type of the previous print order on the list, then the processing time for the previous print order on the list is recalculated without taking into consideration the time to change the paper, and the start time for the current print order on the list is then calculated using the recalculated start time of the previous print order.

If the earliest start time last calculated (or optionally the earliest start time after all of the start times have been calculated) is before the printer operator can begin to print the orders, then the scheduling application program reorders the list by, for example, placing at least some of the print orders with the same paper type in sequence in the list, and then recalculating the start times as described in the previous paragraph. Also, if there is more than one printer with different print speeds, then the scheduling application program can take this factor into account by assigning the print orders with the same paper type which have the most total number of prints to the faster printer.

Those skilled in the art will appreciate that there are other methods of calculating the start times based on the due-by date without placing the orders in a list. For example the scheduling application program could search for a print order with the latest due-by time, calculate the start time for that print order so that the print order is completed by the due-by time, and then, for each of the remaining print orders, search for a print order with the latest due-by time ignoring the print orders for which a start time has already been calculated, and calculate the start time for that print order so that the print order is completed by the last calculated start time.

The scheduling application program sends an instruction to an operator of the photograph printing machine near the time that the paper is to be changed. A message may also be sent to the photograph processing facility that one hour processing is not available for new orders at the present time at the facility due to the back-up of the pending orders. In this situation, the shortest due-by time for new orders would also be reported to the facility.

The updating of the printing schedule for the photograph printing machine is done at frequent intervals such that a customer putting in a new order can be told before leaving the counter of the photograph processing facility, kiosk or internet site if the new print order can not be completed by the requested due-by time. In other words, once the data for a new print order is entered, the new printing schedule for the photograph printing machine will be generated almost immediately, and any notification to the operator of the photograph printing facility will be sent when the new printing schedule is generated.

The embodiments described herein are used to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A system for fulfilling a plurality of print orders, comprising:
   a scheduling application program configured to allow at least one parameter to be entered for each of the print orders; and
   a photograph processing machine,
   wherein the scheduling application program is configured to compute a first print schedule for the photograph processing machine using a first algorithm which has a first acceptance criteria, wherein the first print schedule is selected to print the plurality of print orders on the photograph processing machine if the first print schedule meets the acceptance criteria of the first algorithm, and wherein the scheduling application program is configured to compute a second print schedule using a second algorithm and select the second print schedule to print the plurality of print orders on the photograph processing machine if the first print schedule does not meet the acceptance criteria of the first algorithm.

2. A system in accordance with claim 1, wherein the at least one parameter is a due-by-time, delivery method, paper type, paper size, or printing characteristics.

3. A system in accordance with claim 2, wherein the due-by time is one-hour delivery or overnight delivery.

4. A system in accordance with claim 2, wherein the delivery method is in-store pickup or mail delivery.

5. A system in accordance with claim 2, wherein the printing characteristics include color or black and white.

6. A system for fulfilling a plurality of print orders, comprising:
   a scheduling application program configured to allow at least one parameter to be entered for each of the print orders; and
   an order processing machine,
   wherein the scheduling application program is configured to compute a first print schedule for the order processing machine using a first algorithm which has a first acceptance criteria, wherein the first print schedule is selected to print the plurality of print orders on the photograph printing machine if the first print schedule meets the acceptance criteria of the first algorithm, and wherein the scheduling application program is configured to compute a second print schedule using a second algorithm and select the second print schedule to print the plurality of print orders on the order processing machine if the first print schedule does not meet the acceptance criteria of the first algorithm.

7. A system in accordance with claim 6, wherein the at least one parameter is a due-by-time, delivery method, paper type, paper size, or printing characteristics.

8. A system in accordance with claim 7, wherein the due-by time is one-hour delivery or overnight delivery.

9. A system in accordance with claim 7, wherein the delivery method is in-store pickup or mail delivery.

10. A system in accordance with claim 7, wherein the printing characteristics include color or black and white.

* * * * *